United States Patent
Aleshin et al.

(10) Patent No.: US 11,862,351 B2
(45) Date of Patent: Jan. 2, 2024

(54) ZIRCONIUM-COATED SILICON CARBIDE FUEL CLADDING FOR ACCIDENT TOLERANT FUEL APPLICATION

(71) Applicant: Westinghouse Electric Company LLC, Cranberry Township, PA (US)

(72) Inventors: Yuriy Aleshin, Cayce, SC (US); Joonhyung Choi, Lexington, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 173 days.

(21) Appl. No.: 17/117,259

(22) Filed: Dec. 10, 2020

(65) Prior Publication Data

US 2021/0210220 A1 Jul. 8, 2021

Related U.S. Application Data

(62) Division of application No. 15/178,745, filed on Jun. 10, 2016, now Pat. No. 10,872,701.

(51) Int. Cl.
| | |
|---|---|
| *G21C 3/07* | (2006.01) |
| *G21C 21/02* | (2006.01) |
| *G21C 9/00* | (2006.01) |

(52) U.S. Cl.
CPC ............... *G21C 3/07* (2013.01); *G21C 9/001* (2013.01); *G21C 21/02* (2013.01); *Y02E 30/30* (2013.01)

(58) Field of Classification Search
CPC .................................. G21C 3/07; G21C 21/02
See application file for complete search history.

(56) References Cited

U.S. PATENT DOCUMENTS

| 3,427,185 A | * | 2/1969 | Cheatham | ............... C23C 4/137 |
| | | | | 140/3 A |
| 3,615,277 A | * | 10/1971 | Kreider | ................... B05B 13/02 |
| | | | | 428/654 |
| 3,826,301 A | * | 7/1974 | Brooks | ................... C22C 47/16 |
| | | | | 164/76.1 |

(Continued)

FOREIGN PATENT DOCUMENTS

| JP | 2913015 B2 | * | 6/1999 |
| JP | 5443807 B2 | * | 3/2014 |

(Continued)

OTHER PUBLICATIONS

International Search Report and Written Opinion for International PCT Application No. PCT/US2017/033736, dated Mar. 23, 2018.

(Continued)

*Primary Examiner* — Lily C Garner
(74) *Attorney, Agent, or Firm* — K&L Gates LLP

(57) ABSTRACT

The invention relates to a multi-component cladding for a nuclear fuel rod that includes a combination of ceramic and metal components. More particularly, the invention is directed to a cladding that includes a ceramic composite having a zirconium composition deposited thereon to form a zirconium coated ceramic composite. The ceramic composite includes a ceramic matrix and a plurality of ceramic fibers. The cladding is effective to protect the contents of the cladding structure from exposure to high temperature environments during various load conditions of a nuclear reactor.

12 Claims, 4 Drawing Sheets

(56) References Cited

U.S. PATENT DOCUMENTS

| | | | |
|---|---|---|---|
| 5,260,137 A * | 11/1993 | Rosenthal | C22C 49/12 |
| | | | 428/614 |
| 5,274,686 A * | 12/1993 | Bryan | G21C 3/07 |
| | | | 376/416 |
| 8,971,476 B2 * | 3/2015 | Mazzoccoli | G21C 3/07 |
| | | | 376/416 |
| 9,275,762 B2 * | 3/2016 | Garnier | C04B 35/571 |
| 9,455,053 B2 * | 9/2016 | Xu | G21C 3/07 |
| 9,982,350 B2 * | 5/2018 | Burke | B32B 15/18 |
| 10,060,018 B2 * | 8/2018 | Lahoda | C23C 28/341 |
| 10,593,434 B2 * | 3/2020 | Lahoda | G21C 3/07 |
| 11,404,175 B2 * | 8/2022 | Lahoda | G21C 3/07 |
| 2006/0039524 A1 * | 2/2006 | Feinroth | C04B 35/571 |
| | | | 376/409 |
| 2006/0039527 A1 | 2/2006 | Feinroth et al. | |
| 2006/0063024 A1 * | 3/2006 | Natsuhara | H05K 3/14 |
| | | | 428/596 |
| 2011/0170653 A1 * | 7/2011 | Cabrero | G21C 3/07 |
| | | | 376/416 |
| 2012/0087457 A1 * | 4/2012 | Garnier | C04B 35/573 |
| | | | 376/416 |
| 2013/0010915 A1 * | 1/2013 | Garnier | G21C 3/17 |
| | | | 376/417 |
| 2013/0077731 A1 | 3/2013 | Sherwood et al. | |
| 2013/0344348 A1 * | 12/2013 | Koo | B23K 35/005 |
| | | | 428/553 |
| 2014/0153688 A1 * | 6/2014 | Zabiego | G21C 3/07 |
| | | | 376/409 |
| 2015/0131768 A1 | 5/2015 | Pop et al. | |
| 2015/0228363 A1 * | 8/2015 | Dewan | G21C 3/06 |
| | | | 376/458 |
| 2017/0358372 A1 | 12/2017 | Aleshin et al. | |
| 2019/0115112 A1 | 4/2019 | Petroski et al. | |

FOREIGN PATENT DOCUMENTS

| | | | |
|---|---|---|---|
| KR | 20130117124 A * | 10/2013 | |
| KR | 101405396 B1 | 6/2014 | |
| KR | 20140147404 A * | 12/2014 | |
| KR | 101486260 B1 * | 1/2015 | |
| KR | 20140125002 A | 1/2015 | |
| KR | 101526305 B1 | 6/2015 | |
| KR | 20140147404 A | 6/2015 | |
| KR | 20150100915 A | 9/2015 | |
| WO | 2014039641 A2 | 3/2014 | |
| WO | 2018044371 A2 | 3/2018 | |

OTHER PUBLICATIONS

Supplementary European Search Report for European Patent Application No. 1784711.9, dated Nov. 29, 2019.

* cited by examiner

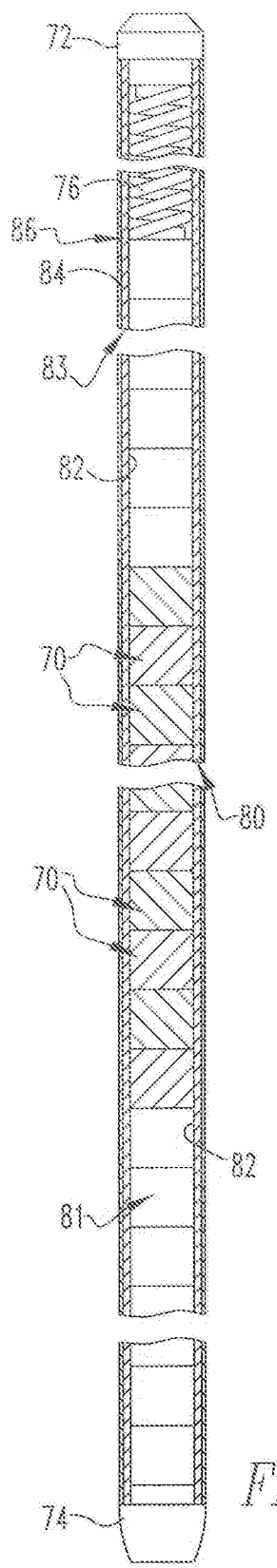
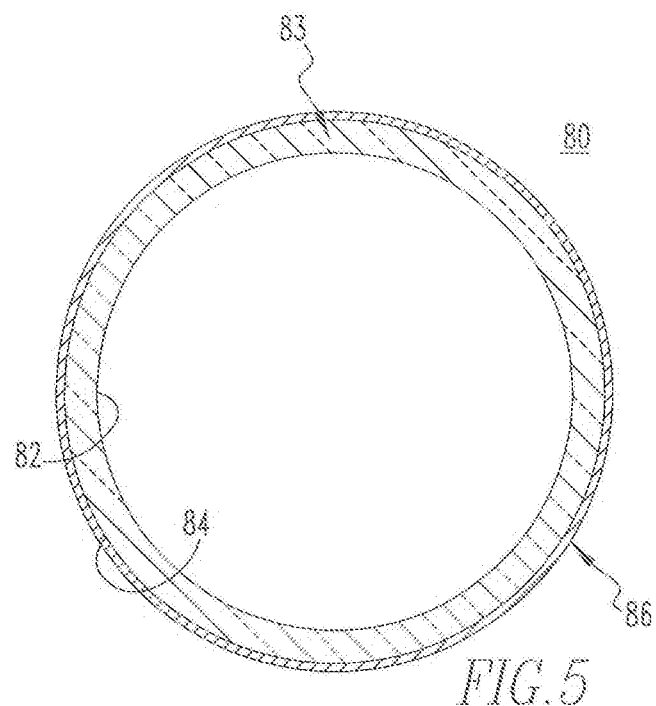

ZIRCONIUM-COATED SILICON CARBIDE FUEL CLADDING FOR ACCIDENT TOLERANT FUEL APPLICATION

CROSS-REFERENCE TO RELATED APPLICATIONS

This application is a divisional application claiming priority under 35 U.S.C. § 120 to U.S. patent application Ser. No. 15/178,745, entitled ZIRCONIUM-COATED SILICON CARBIDE FUEL CLADDING FOR ACCIDENT TOLERANT FUEL APPLICATION, filed Jun. 10, 2016, the entire disclosure of which is hereby incorporated by reference herein.

BACKGROUND

1. Field

The invention relates to a ceramic composite having a zirconium coating applied thereto for use in constructing nuclear fuel components, such as, fuel rod cladding, for use in high temperature environments to serve as a barrier to protect the contents of the components, e.g., cladding, and methods of making the zirconium-coated ceramic composite.

2. Description of Related Art

A nuclear power reactor can include a reactor core having a large number of fuel assemblies, each of which is composed of a plurality of elongated fuel elements or fuel rods. Fuel assemblies vary in size and design depending on the desired size of the core and the size of the reactor. The fuel rods each contain fissile fuel material, such as, fuel pellets containing uranium with some amount of fissile U235 or U233 and/or plutonium. Fission of the fissile components causes heat generation. A coolant, such as water, liquid salt, gas or a liquid metal, is pumped through the reactor core to extract the heat generated in the reactor core for the production of useful work such as electricity.

Each of the fuel rods has a cladding that acts as containment to hold the radioactive fuel material and to separate the fuel material from the coolant medium. Further, during operation, fission generates gaseous and, volatile and non-volatile fission products that are highly radioactive. These fission products are also restrained by the cladding. In conventional metallic cladding systems, irradiation over time causes damage to the metal in terms of hardening and embrittlement, and material swelling.

FIG. 1 shows an exemplary reactor pressure vessel 10 and nuclear core 14. The nuclear core 14 includes a plurality of parallel, vertical, co-extending fuel assemblies 22. For purpose of this description, the other vessel internal structures can be divided into lower internals 24 and upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 1), and support and guide instrumentation and components, such as control rods 28. In the exemplary reactor shown in FIG. 1, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies are seated and through and about the assemblies. In some designs, the lower support plate 37 and the lower core plate 36 are replaced by a single structure, a lower core support plate having the same elevation as 37. The coolant flow through the core and surrounding area 38 is typically large, on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially outward to one or more outlet nozzles 44.

One of the exemplary fuel assemblies 22 as shown in FIG. 1 is shown in more detail in FIG. 2. Each of the fuel assemblies 22 includes fuel rods 66 grouped in an array thereof. The fuel rods 66 are held in spaced relationship with one another by the grids 64 spaced along the fuel assembly length. At its lower end, a bottom nozzle 58 supports each of the fuel assemblies 22 on a lower core plate 36. At its upper end, each of the fuel assemblies 22 includes a top nozzle 62. An instrumentation tube 68 is located in the center and extends between and is mounted to the bottom and top nozzles 58 and 62. Each fuel rod 66 includes a plurality of nuclear fuel pellets 70 and is closed at its opposite ends by upper and lower end plugs 72 and 74, respectively. The pellets 70 are maintained in a stack by a plenum spring 76 disposed between the upper end plug 72 and the top of the pellet stack. The fuel pellets 70, composed of fissile material, are responsible for creating the reactive power of the reactor.

Each of the fuel rods 66 includes a cladding which surrounds the pellets to function as a barrier to prevent the fission by-products from entering the coolant and further contaminating the reactor system.

One of the exemplary fuel rods 66 of FIG. 2 is shown in more detail in FIG. 3. As shown in FIG. 3, each of the fuel rods 66 includes a stack of the plurality of nuclear fuel pellets 70, the upper and lower end plugs 72 and 74, respectively, and the spring 76 which serves as a hold-down device to maintain the stacked configuration of the pellets 70. In addition, FIG. 3 shows the fuel rod cladding 2 which surrounds the pellets 70 to function as a barrier to prevent the fission by-products from entering the coolant and further contaminating the reactor system. The cladding 2 is typically in the shape of an elongated tube having a cavity formed therein and two opposing open ends. The upper and lower end plugs 72 and 74, respectively, provide a seal and prevent reactor coolant that is circulating in the core from entering the cavity of the fuel rod cladding 2.

Recent developments in the art have provided fuel rod cladding composed of a ceramic-containing material, such as silicon carbide (SiC). SiC has been shown to exhibit desirable properties in beyond design basis accidents, e.g., at temperatures greater than 1200° C. in light water reactors and, therefore, may be considered a suitable material of construction for nuclear fuel rod claddings. A benefit of SiC cladding is the ability to minimize a zirconium steam reaction that may occur during a severe accident and can potentially cause a dangerous hydrogen explosion. However, there are disadvantages associated with a SiC cladding. For example, during out-of-pile testing, there were evidences that a bare SiC cladding may exhibit surface corrosion due to exposure to coolant from a pressurized water reactor and, formation of hydro-peroxide on the SiC surface could result in severe flaking of SiC, causing significant and rapid weight loss. More particularly, SiC cladding has demonstrated difficulty in achieving hermeticity while retaining material ductility and high temperature strength. It is believed that this property conflict may be due to the need for micro-cracking, which promotes extension during straining of the SiC cladding.

There is a desire in the art to provide a cladding material that provides high temperature mechanical strength and stability, swelling resistance and corrosion resistance, while providing hermeticity of the SiC cladding and protection against micro-cracking and corrosion from reactor cooling during normal operation, operational transients, design basis accidents and beyond design basis accidents. Since a single material, e.g., SiC, may not be capable of providing all of the desirable properties for a cladding, it is an object of the invention to provide a cladding that includes more than one material, i.e., ceramic and zirconium, each exhibiting a different property that is advantageous for the cladding. The presence of the zirconium coating, in accordance with the invention, is effective to preclude the loss of hermeticity due to micro-cracks in the ceramic composite, i.e., SiC.

SUMMARY OF THE INVENTION

In one aspect, the invention provides a nuclear fuel rod cladding including a ceramic composite and a coating composition. The ceramic composite includes a ceramic matrix and a plurality of ceramic fibers. The ceramic composite is structured to form a shape that has an interior surface, an exterior surface, and an inner cavity. The coating composition is deposited on the exterior surface of the ceramic composite to form a coating thereon, the composition includes a zirconium component that is composed of zirconium alloy.

In certain embodiments, the ceramic composite is in the shape of a cylindrical tube.

In certain embodiments, the zirconium coating has a thickness from about 0.004 to about 0.006 inches.

In certain embodiments, the ceramic composite includes a silicon carbide matrix and silicon carbide fibers. The silicon carbide fibers can be selected from individual fibers, woven fibers and braided fibers.

In another aspect, the invention provides a method for forming a nuclear fuel rod cladding. The method includes preparing a ceramic composite including a ceramic matrix and ceramic fibers, forming the ceramic composite in a shape such that it has an interior surface, an exterior surface and an inner cavity, and depositing on the exterior surface of the ceramic composite a coating composition to form a coating thereon, the composition includes a zirconium component that is composed of zirconium alloy.

In certain embodiments, preparing the ceramic composite can include obtaining ceramic fibers in a form of fiber tows; forming a woven ceramic fiber structure, wherein voids are formed therein; and depositing the ceramic matrix over the woven ceramic fiber structure to at least partially fill the voids. The method can include wrapping, winding or braiding the ceramic fibers. In certain embodiments, the method includes winding the ceramic fibers in the form of filaments over a mandrel.

In certain embodiments, depositing the ceramic matrix can include employing a process selected from chemical vapor deposition, chemical vapor infiltration and sol gel infiltration.

In certain embodiments, depositing the coating composition can include employing a process selected from arc spray, liquid phase spray, plasma spray, cold spray and laser deposition.

BRIEF DESCRIPTION OF THE DRAWINGS

A further understanding of the invention can be gained from the following description of the preferred embodiments when read in conjunction with the accompanying drawing in which:

FIG. 4 is a cross-section view, partially in section of a fuel rod, in accordance with certain embodiments of the invention; and FIG. 5 is a cross-sectional view of the fuel rod cladding tube as shown in FIG. 4, having a zirconium coating deposited on the surface of a ceramic composite, in accordance with certain embodiments of the invention.

DESCRIPTION OF THE PREFERRED EMBODIMENT

Figure 1:
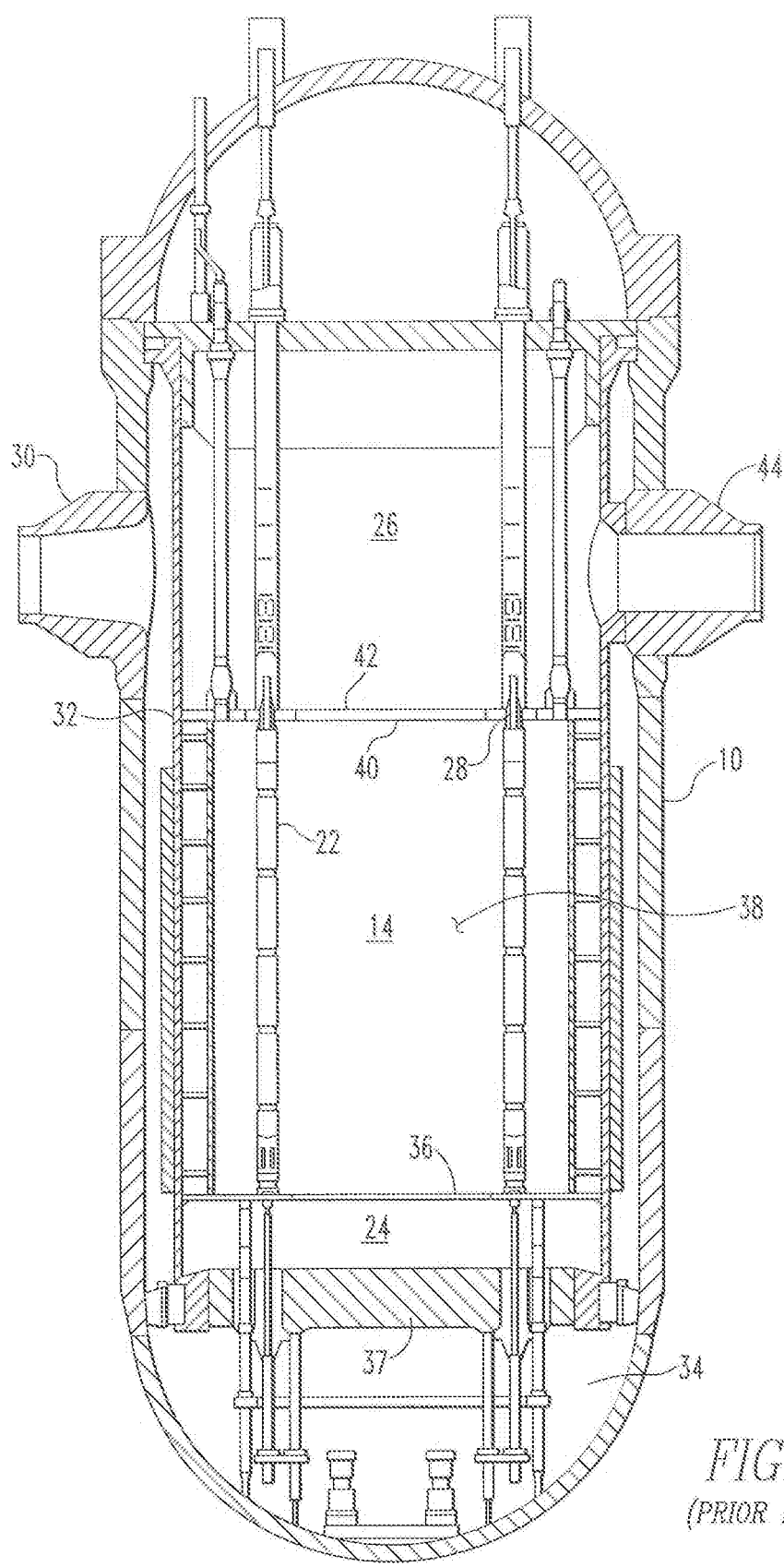
FIG. 1 is an elevational view, partially in section of a nuclear reactor vessel and internal components, in accordance with the prior art.

The present invention relates generally to a coated composite material for nuclear fuel components, such as, but not limited to, fuel rod cladding, as well as methods of preparation. The coated composite includes a combination of ceramic and metallic components. The ceramic component is in the form of a ceramic composite that includes a ceramic matrix and ceramic fibers. The ceramic composite includes silicon carbide. Thus, in certain embodiments, the ceramic matrix and/or the ceramic fibers are composed of silicon carbide or silicon carbide-containing material. The metallic component is in the form of a coating composition and includes zirconium alloy.

In accordance with the invention, the ceramic composite is formed or shaped into the nuclear fuel component, such as, fuel rod cladding, which includes an interior surface, an exterior surface and a cavity formed therein, and the coating composition is deposited on the exterior surface of the ceramic composite, e.g., cladding, to form thereon a zirconium coating, e.g., thin film.

Without intending to be bound by any particular theory, it is believed that the presence of the zirconium coating serves as an Environmental Barrier Coating (EBC) on the ceramic composite and therefore, is effective to mitigate the potential for corrosion that is generally associated with ceramic, e.g., when in contact with coolant water in a nuclear water reactor. In addition, the zirconium coating effectively contributes to maintaining hermeticity of the ceramic composite cladding due to micro-cracking of the ceramic, e.g., silicon carbide, matrix under various loading conditions during operation, such as, system pressure, thermal quenching, fatigue, impact during seismic/Loss of Coolant Accident (LOCA), impact during handling, and the like.

In general, the zirconium coating forms a hermetic barrier for fission products and may also provide some mechanical support for the cladding structure. The ceramic composite can be composed of silicon carbide fibers distributed or embedded within a silicon carbide matrix, or interlocking woven or braided fibers, e.g., fiber tows wrapped to form a woven structure. In general, the zirconium-coated, ceramic composite is an effective barrier to protect the contents contained within the cladding structure from exposure to high temperature environments and mechanical stresses. For example, the cladding may be suitable for use as fuel cladding for containing nuclear fuel in reactor environments having liquid coolant circulating at high temperatures. The fuel cladding has the capability to withstand normal and accident conditions, such as, design basis accidents and beyond design basis accidents, associated with nuclear fuel reactors. For ease of description, the invention is described herein in the context of a fuel cladding for containing or holding radioactive fuel pellets, wherein the cladding is placed in a reactor core and exposed to high temperature coolant circulating around the outside of the cladding and through the core. However, it is understood that the invention is not limited to this context.

Figure 2:
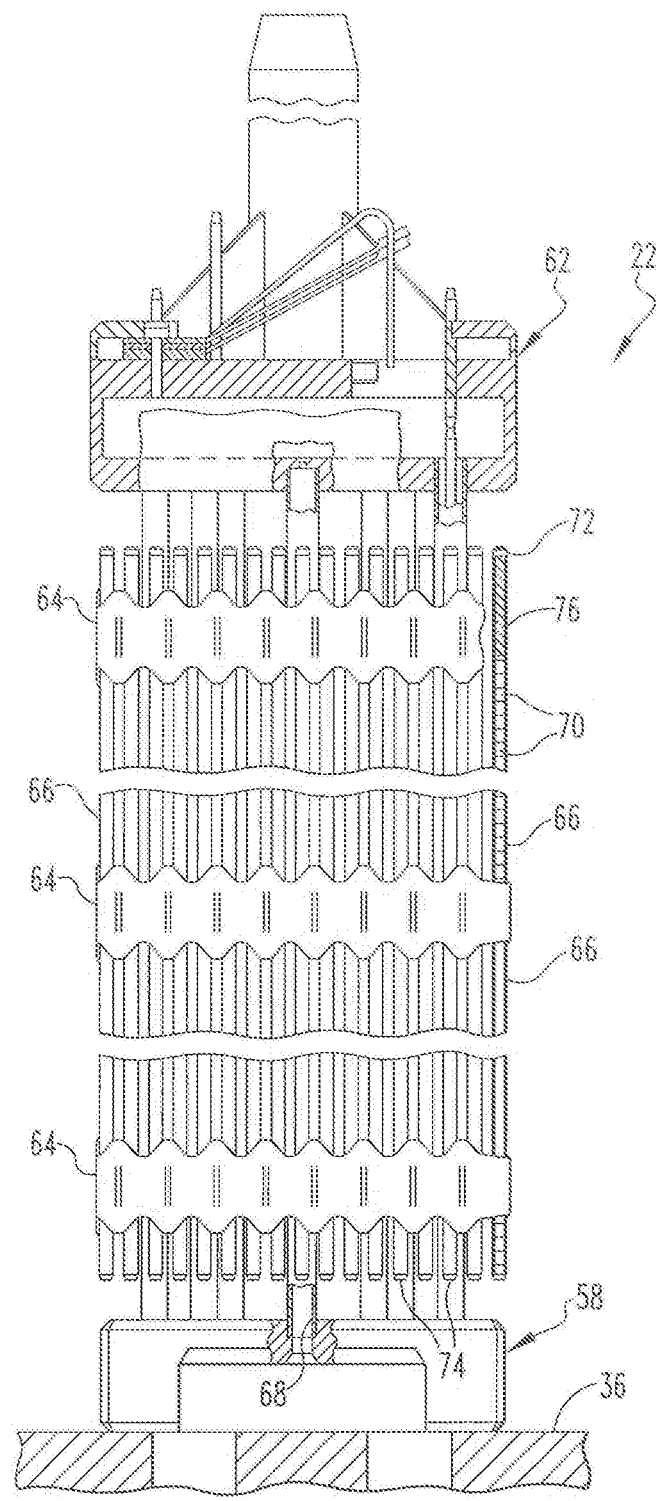
FIG. 2 is an elevational view, partially in section of a fuel assembly illustrated as shown in FIG. 1 in vertically shortened form, with parts broken away for clarity, in accordance with the prior art.
Figure 3:
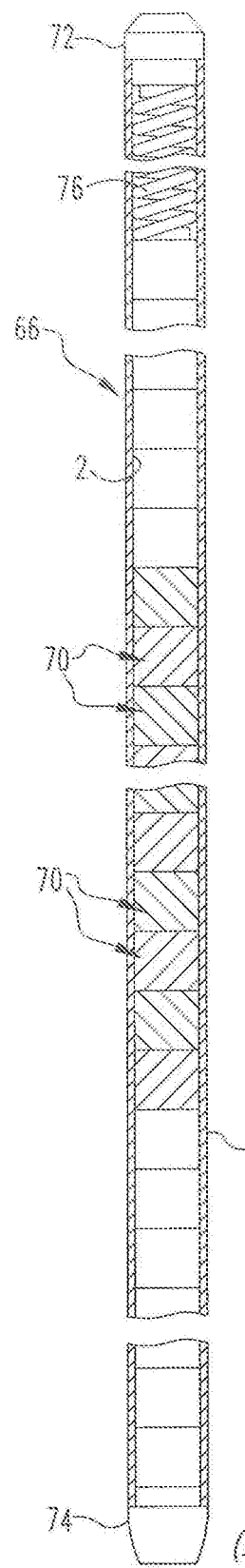
FIG. 3 is a cross-section view, partially in section of a fuel rod, in accordance with the prior art.

Fuel rod cladding is typically in the shape of an elongated tube having a cavity formed therein and two opposing open ends. The thickness of the tube wall can vary. In certain embodiments, the tube wall thickness is from about 100 to about 1000 microns. The cavity has fuel pellets contained therein and typically a hold-down device, such as a spring, to maintain the configuration, e.g., a stack, of the fuel pellets. A sealing mechanism is typically positioned at or in each open end of the cladding to provide a seal and prevent the coolant circulating in the core from entering the cavity of fuel rod cladding. (As shown in FIG. 3.) The fuel rod cladding is positioned in the core of the nuclear reactor. (As shown in FIG. 2.)

Fuel rod cladding is primarily intended to contain fissile fuel pellets in which fission is causing heat generation and, to separate from a coolant medium the fuel pellets and fission products resulting from the fission. The cladding is typically composed of either a metallic material, e.g., zirconium or zirconium alloy, or alternatively a ceramic material, e.g., silicon carbide. There are advantages and disadvantages associated with each of the metallic cladding and ceramic cladding. For example, metallic cladding provides good hermeticity, good ductility, adjustable strength and a protective corrosion resistant layer. In contrast, ceramic cladding provides high stiffness, high temperature strength, high temperature survivability in oxidative and corrosive environments.

As to conventional ceramic cladding, it is known in the art to coat an outer surface of a cladding composed of ceramic composite, e.g., silicon carbide matrix with silicon carbide fibers, with a silicon carbide monolithic layer, in the absence of a metal layer. This configuration is referred to in the art as "duplex". Further, it is known to in the art to coat both of an inner surface and an outer surface of a cladding composed of ceramic composite, e.g., silicon carbide matrix with silicon carbide fibers, with a silicon carbide monolithic layer, in the absence of a metal layer. This configuration is referred to in the art as "triplex". Furthermore, it is known in the art to apply a liner composed of metal, e.g., chromium tungsten, to an inner surface of a cladding composed of ceramic composite, e.g., silicon carbide matrix with silicon carbide fibers, and to apply a silicon carbide monolithic layer to the surface of the metal liner, such that the metal liner is positioned between the ceramic composite and the silicon carbide monolithic layer. Thus, this is referred to in the art as the "sandwich" configuration.

The fuel rod cladding in accordance with the invention provides a multi-component material system that combines both metal, e.g., zirconium alloy, and ceramic materials, e.g., silicon carbide matrix and fibers, such that properties and advantages associated with each of these materials can be exhibited in the cladding. The invention includes a ceramic composite tube and a metal composition, which consists of a zirconium alloy, deposited in the form of a coating on an outer surface of the ceramic composite tube. In general, the fuel rod cladding composed of the multi-component material avoids problems associated with conventional ceramic composite systems, such as, difficulty in achieving hermeticity, while retaining material ductility and high temperature strength. The presence of the zirconium coating is effective to preclude the loss of hermeticity due to micro-cracks in the silicon carbide material and protection against corrosion from reactor coolant.

FIG. 4 is a schematic, cross-section view, of a fuel rod in accordance with certain embodiments of the invention. As shown in FIG. 4, the cladding 80 of the fuel rod is in the form of a cylindrical tube. It is contemplated and understood that the shape of the cladding is not limiting and can include a wide variety of shapes and configurations. For example, the cladding can be in the form of a box structure or other closed form including two-dimensional axially or conically extended structures. Further, the structure may be consistently shaped or inconsistently shaped; that is, the shape may be adjusted to accommodate variations in diameter along its length. Furthermore, it is contemplated that the cylindrical tube may be used in a variety of environments, such as, but not limited to, a reactor wherein the cladding 80 has contained therein a fuel element.

In FIG. 4, the cladding 80 includes the cylindrical tube, which, as a non-limiting example, may be a preformed cylinder, that has an inner cavity 81 and an interior surface 82. The cladding 80 is composed of a ceramic composite 83 and a zirconium layer 86 deposited on a surface 84 of the ceramic composite 83. The inner cavity 81 of the cladding 80 also includes a stack of the plurality of nuclear fuel pellets 70, the upper and lower end plugs 72 and 74, respectively, and the spring 76 which serves as a hold-down device to maintain the stacked configuration of the pellets 70. The cladding 80 surrounds the pellets 70 to function as a barrier to prevent the fission by-products from entering the coolant and further contaminating the reactor system. The upper and lower end plugs 72 and 74, respectively, provide a seal and prevent reactor coolant that is circulating in the core from entering the inner cavity 81 of the cladding 80.

FIG. 5 is a schematic that shows a cross section of a zirconium-coated, ceramic composite cladding in more detail. As shown in FIG. 5, the cladding 80 is composed of the ceramic composite 83 that includes a ceramic matrix and ceramic fibers, wherein the ceramic can include silicon carbide or a silicon-carbide-containing material. The zirconium layer 86, e.g., in the form of a coating, such as, a thin film, is applied to the surface 84 of the ceramic composite 83. The zirconium layer 86 is composed of zirconium or zirconium alloy. The zirconium layer 86 is exposed to and in contact with coolant that circulates in a nuclear reactor and is effective to preclude the coolant from contacting the ceramic composite 83, which is positioned underneath of the zirconium layer 86.

As described herein, the cladding 80 includes ceramic, e.g., silicon carbide/silicon carbide-containing, matrix and ceramic, e.g., silicon carbide/silicon carbide-containing, fibers. Generally, the fibers are distributed or embedded in the matrix. The fibers can include interlocking woven or braided, e.g., wound, fibers. The thickness of the cladding 80 can vary. For example, the cladding 80 can have a thickness in the range from about 100 to about 600 microns. The cladding 80 is typically formed using conventional apparatus and processes.

In certain embodiments, the ceramic composite 83 may be constructed by pre-stressing a fiber component, forming fibers into tows, wrapping, wounding or braiding the fibers in a form of, for example, a cylindrical tube. In certain embodiments, a continuous braid lay-up (preforming) or filament winding over a mandrel can be employed. Typically, there are voids that exist between individual or groups of fibers and therefore, following the wrapping, winding or braiding step, the ceramic matrix is applied to at least partially fill the voids formed between the fibers. In addition, a thin (sub-micron) interface layer may be incorporated between the fibers and the adjacent ceramic matrix. The presence of the interface layer allows for ductile behavior.

The ceramic matrix can be deposited or applied by employing chemical vapor infiltration (CVI) or chemical vapor deposition (CVD) technology. As used herein, CVI refers to depositing the ceramic matrix in pores using decomposed gaseous matrix precursors and CVD refers to depositing the ceramic matrix on surfaces using decomposed gaseous matrix precursors. In certain embodiments, CVI is conducted at temperatures from about 300° C. to about 1100° C. depending on the particular CVI process and apparatus employed. Traditional decomposition-based CVI occurs from about 900° C. to about 1100° C. In certain embodiments, atomic layer deposition-based SiC deposition is carried out at temperatures from about 300° C. to about 500° C.

Alternatively, a conventional sol gel infiltration, drying and firing process may be used to form the ceramic composite.

The zirconium layer 86 provides a protective coating over the ceramic composite 83. This zirconium or zirconium alloy layer provides hermeticity of the ceramic composite cladding 80 and protection against corrosion from reactor coolant during normal operation, operational transients, design basis accidents and beyond design basis accidents. The coating thickness of the zirconium layer 86 can vary and may depend on the selection of zirconium alloy. This zirconium alloy layer will be sufficiently thick to prevent exposure of the underlying ceramic composite 83 from exposure to the coolant, taking into account operational induced effects, such as, but not limited to zirconium oxidation, grid-to-rod fretting wear, and the like, and provide a smooth surface to facilitate fuel rod insertion. Also, the thickness of the zirconium layer 86 will be appropriate to prevent excessive zirconium-steam reaction during a beyond design basis accident. That is, the maximum layer thickness is determined, and limited to, a thickness that is effective to prevent excessive hydrogen reaction during a beyond design basis accident condition.

In certain embodiments, the zirconium layer, e.g., layer 86, has a thickness in the range of about 0.004 to about 0.006 inches. This thickness can correspond to design criteria for a traditional zirconium cladding design, which includes the ability to accommodate (i) 10% (0.0023 mils) wall thickness reduction due to grid-to-rod fretting wear and (ii) not more than 17% (0.0038 mils) wall thickness loss by oxidation during a Loss of Coolant Accident (LOCA). Furthermore, this thickness can correspond to design criteria based on reduction of at least 70% of the total amount of zirconium in a typical fuel assembly having zirconium alloy cladding. Thus, the fuel rod cladding in accordance with the invention can reduce the amount of zirconium in a nuclear reactor core by at least 70%, resulting in a reduction of the zirconium-steam reaction in order to reduce or preclude the generation of excessive hydrogen.

The zirconium layer, e.g., layer 86, is typically formed using conventional coating apparatus and deposition processes. For example, the zirconium layer 86 may be formed by employing arc spray, liquid phase spray, plasma spray, cold-spray or laser deposition for applying a coating composition and forming a coating having a thickness that is sufficiently thick to provide complete coverage of the surface of the underlying ceramic composite 83, and to retain a protective surface layer over the lifetime of the cladding. Preferred methods include plasma spray or laser deposition of the zirconium or zirconium alloy composition onto the ceramic composite.

The ceramic composite, e.g., both of the fibers and matrix, and the zirconium coating exhibit high strength and stiffness at both reactor normal operating temperature, and at higher temperatures that are typical of design basis and beyond design basis accidents.

The zirconium-coated, ceramic composite fuel rod cladding in accordance with the invention, provides at least one or more of the following benefits as compared to conventional claddings known in the art:

(i.) Hermeticity of the surface of the cladding tube with respect to gaseous and volatile fuel fission products under various loading conditions;

(ii.) Smooth, even surface of the cladding tube to facilitate fuel rod insertion process;

(iii.) Sufficient thickness to protect against grid-to-rod fretting wear to prevent exposure of ceramic cladding to nuclear reactor coolant;

(iv.) Sufficient thickness for 17% LOCA oxidation limit;

(v.) Appropriate thickness to prevent excessive zirconium-steam reaction during a Beyond Design Basis Event;

(vi.) Reduction of at least 70% of the total amount of zirconium in a fuel assembly of a nuclear reactor;

(vii.) Capability to demonstrate high temperature strength and toughness, as well as swelling resistance and void formation resistance in response to irradiation;

(viii.) Mechanical tolerance to very high temperatures and high mechanical strains;

(ix.) Mechanical support and containment of fuel debris in the event of accident conditions; and (x.) Corrosion resistance and oxidation protection of the surface of the cladding tube.

During operation in a reactor, internal pressure generated by gas production from the fuel is restrained by the cladding. The cladding functions include containing the fuel and fuel fission products, providing mechanical strength and stability, and providing protection and hermeticity to the external environment. As a result of the zirconium-coated, ceramic composite of the invention, the need for high temperature strength, swelling resistance and, corrosion resistance in a single material is avoided.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method for preparing a nuclear fuel rod cladding, comprising:
preparing a ceramic composite, which comprises:
a ceramic matrix; and
a plurality of ceramic fibers;
forming the ceramic composite in a shape such that it has an interior surface, an exterior surface and an inner cavity; and
depositing on the exterior surface of the ceramic composite a metallic coating composition to form a coating thereon, the composition comprising a zirconium component composed of zirconium alloy, wherein the depositing comprises arc spray, liquid phase spray, cold spray, laser deposition, or a combination thereof, wherein the nuclear fuel rod cladding consists of the ceramic composite and the coating.

2. The method of claim 1, wherein preparing the ceramic composite comprises:
obtaining the plurality of ceramic fibers in a form of fiber tows;
forming a woven ceramic fiber structure, wherein voids are formed therein; and
depositing the ceramic matrix over the woven ceramic fiber structure to at least partially fill the voids.

3. The method of claim 2, wherein the forming a woven ceramic fiber structure employs a process selected from the group consisting of wrapping, winding and braiding.

4. The method of claim 3, wherein the forming a woven ceramic fiber structure employs a winding process and the winding process comprises winding the ceramic fibers in the form of filaments over a mandrel.

5. The method of claim 4, wherein the depositing a ceramic matrix comprises employing a process selected from chemical vapor deposition, chemical vapor infiltration and sol gel infiltration.

6. The method of claim 5, wherein the depositing a coating composition comprises arc spray.

7. The method of claim 5, wherein the depositing a coating composition comprises liquid phase spray.

8. The method of claim 5, wherein the depositing a coating composition comprises plasma spray.

9. The method of claim 5, wherein the depositing a coating composition comprises cold spray.

10. The method of claim 5, wherein the depositing a coating composition comprises laser deposition.

11. The method of claim 5, wherein the coating comprises a thickness in a range of 0.004 inch to 0.006 inch.

12. The method of claim 11, wherein a thickness of the nuclear fuel rod cladding is in a range of 100 microns to 600 microns.

* * * * *